April 29, 1952 G. B. MARSDEN 2,594,574
PROTRACTOR
Filed Nov. 2, 1950 2 SHEETS—SHEET 1
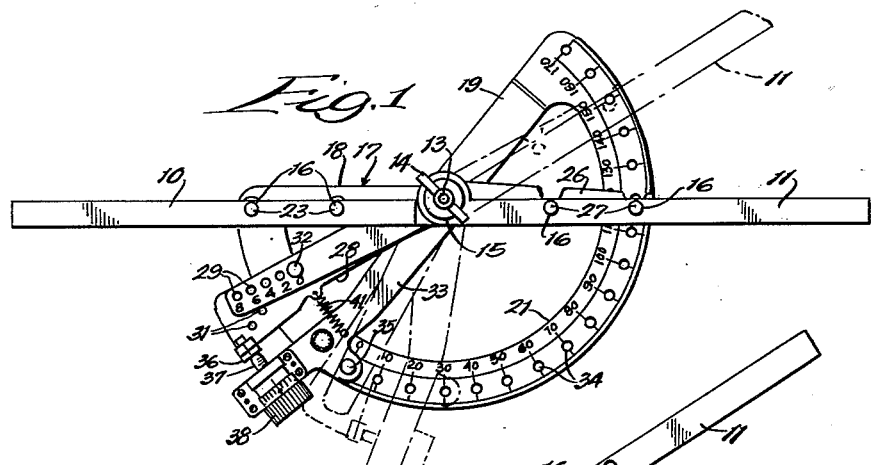
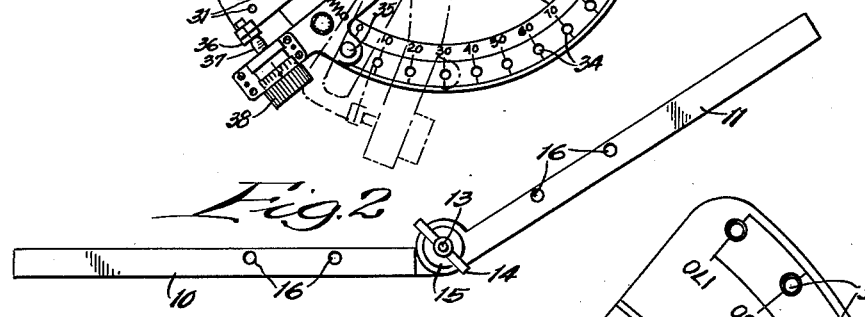
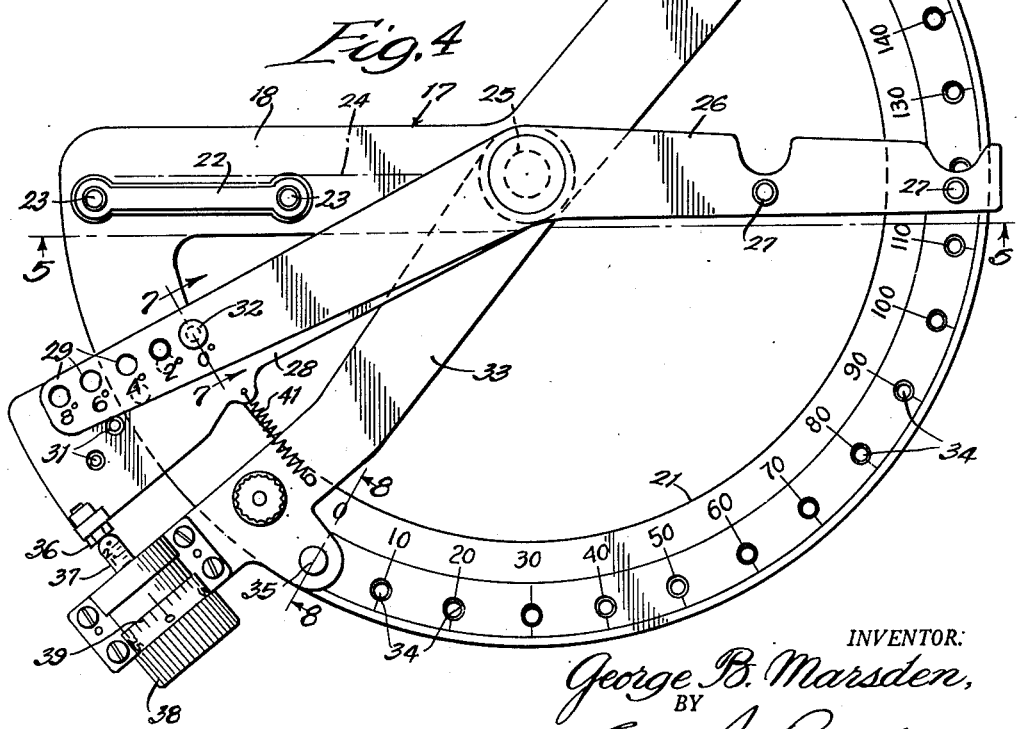
INVENTOR:
George B. Marsden,
BY
ATTORNEY.

April 29, 1952 G. B. MARSDEN 2,594,574
PROTRACTOR
Filed Nov. 2, 1950 2 SHEETS—SHEET 2
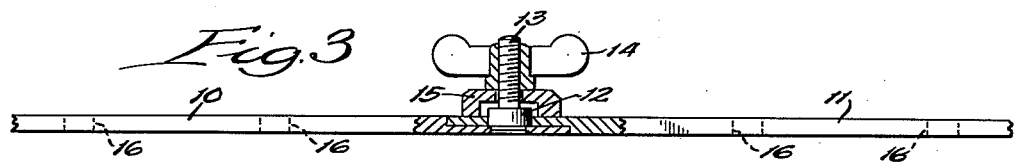
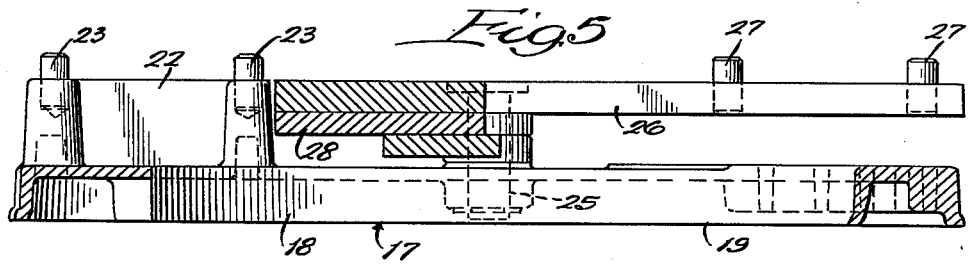
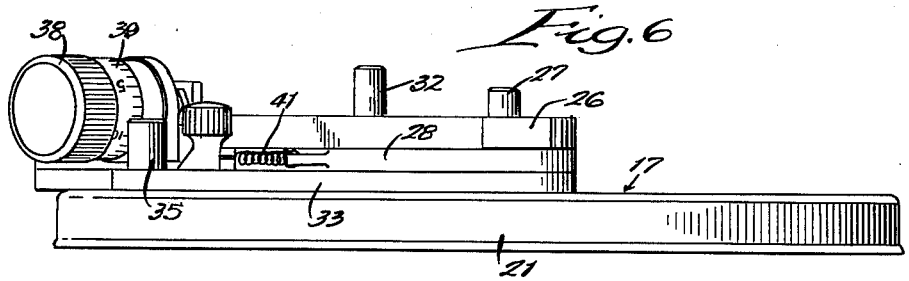
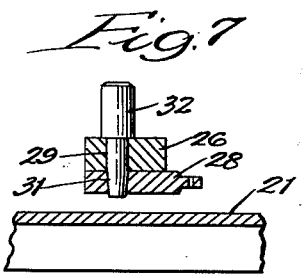
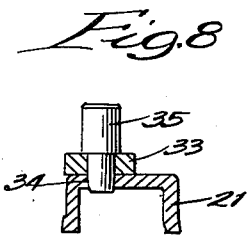
INVENTOR.
George B. Marsden,
BY
E. S. Booth,
ATTORNEY Patented Apr. 29, 1952

2,594,574

UNITED STATES PATENT OFFICE 2,594,574

PROTRACTOR

George B. Marsden, Chicago, Ill.

Application November 2, 1950, Serial No. 193,636

6 Claims. (Cl. 33—75)

This invention relates to protractors, and more particularly to protractor constructions for setting desired angles with a relatively high degree of accuracy.

In protractors as used in machine and lay-out work three general types have heretofore been provided. One type is the common protractor which is read by eye and with which it is substantially impossible to obtain accuracy closer than about the nearest degree. The second type is a shop precision protractor using a vernier scale which is capable of accurate measurements to about the nearest ten minutes. The third is sine bar setup using extremely expensive Johansen blocks and the like and which is very slow and complicated to use but which can be set to produce very accurate measurements.

For many types of work a greater accuracy is required than can be obtained with the common protractor or the vernier type shop protractor, but the cost and complications of a sine bar setup are not justified, nor is the degree of accuracy obtainable with a sine bar setup required. The present invention accordingly has for one of its objects the provision of a protractor satisfying the requirements of such types of work and providing a relatively high degree of accuracy without involving the high cost, the extreme accuracy, and the delicacy of sine bar setups.

Another object is to provide a protractor in which pivotal interconnected bars can be set to the desired angle and held in set position for lay-out work, machine work and the like.

Still another object is to provide a protractor in which the angle of a lever pivoted on a frame relative to a base or reference line on the frame can be easily and quickly set with a relatively high degree of accuracy.

According to one feature of the invention, a plurality of levers are coaxially pivoted on the frame and are adjustably connected together, with one of the levers adjustably connected to the frame. In the preferred construction one of the levers can be connected to the frame at any one of a plurality of points corresponding to predetermined angular intervals, a second of the levers is connected to the first by a fine angle-adjusted means such as a micrometer screw, and the second lever is connected to the third lever whose angle is to be set in any one of a plurality of relatively angular positions corresponding to smaller predetermined angular intervals.

The above and other objects and features of the invention will be more readily apparent from the following description when read in connection with the accompanying drawings, in which:

Figure 1 is a plan view of a protractor construction embodying the invention; Figure 2 is a plan view of the angular connected bars removed from the setting mechanism; Figure 3 is an enlarged side elevation of the bars with parts in section; Figure 4 is an enlarged plan view of the setting mechanism; Figure 5 is a section from the line 5—5 of Figure 4; Figure 6 is a side elevation looking from the right of Figure 4, and Figures 7 and 8 are partial detail sections on the lines 7—7 and 8—8, respectively, of Figure 4.

The instrument as shown includes a pair of flat bars 10 and 11 pivotally connected together through a rivet or the like 12 for angular adjustment relative to each other. As best seen in Figure 3, the meeting ends of the bars are thinned and overlap to provide a flat-bottom surface. The rivet 12 carries a screw extension 13 on which a wing nut 14 is threaded. The wing nut engages a collar 15 to press the overlapped end portions of the bars together so that they will be firmly held in a desired adjusted position but can be released for angular adjustment.

The bars 10 and 11 are formed with spaced guide engaged portions shown as spaced circular openings 16 to fit over guide pins on the setting device. The setting device comprises a frame 17, which may be cast or formed in any other desired manner. The frame, as best seen in Figure 4, has angularly joined arms 18 and 19 which are connected by an arcuate body portion 21. The bar 18 has a raised base 22 thereon carrying spaced guide pins 23 which define a base or reference line on the frame and are spaced to fit into the openings 16 in the bar 10. It will be noted that the base line need not necessarily pass through the pins 23 but may be parallel to a line through the pins and in the form shown, is spaced from the pins as indicated at 24.

A plurality of levers are pivoted on the frame on a common pivot pin 25 located at the intersection of the arms 18 and 19. An upper main lever 26 is in the form of an angular bell crank lever pivoted at its center, with one end carrying spaced pins 27 defining a reference line on the lever. It will be noted that the pivotal axis of the levers lies on the base line 24, and that the pins 27 define a reference line also passing through the axis. In the construction shown the base and reference lines correspond to the inner edges of the bars 10 and 11, which intersect the pivot pin 12 and the pivotal axis of the levers when the bars are assembled on the base mechanism.

The opposite end of the lever 26 overlies an intermediate lever 28 and is adapted to be adjustably connected thereto in any one of a plurality of positions. As shown, the lever 26 is formed with a series of holes 29 spaced along its length and adapted to register respectively with holes 31 in the end of the lever 28. The holes 29 may lie on a radius through the pivotal axis of the levers, while the holes 31 are progressively spaced circumferentially so that when the different pairs of holes are brought into register the relative angular positions of the levers will be adjusted. As shown, the holes are spaced an amount corresponding to 2° so that the levers can be adjusted relative to each other through 2° intervals for a purpose to appear more fully hereinafter. The levers may be connected in any desired relative position by a pin 32 to fit into the openings 29 and 31. Preferably the openings and the pin are slightly tapered, as best seen in Figure 7, to ensure an accurate locking of the levers relative to each other.

A third underlying lever 33 is pivoted on the pin 25 and is adapted to be held in any one of a plurality of angular positions on the frame. For this purpose the lever 33 is formed with an opening adapted to register with any selected one of a series of openings 34 in the curved frame bar 21. A pin 35 may be inserted through the openings to hold the lever 33 in selected position, and may be tapered as described above to lock the lever securely and accurately. The openings 34 may be spaced according to a desired angular interval, and, as shown, are spaced to correspond to 10° intervals.

The lever 33 is adjustably connected to the lever 28 to provide for fine angle adjustments. For this purpose, as shown, the lever 28 carries a raised stop 36 which may be adjustable to calibrate the device, and which is engaged by a micrometer-type screw 37 carried by the end of the lever 33. The screw is adapted to be turned by a knob 38, which may be calibrated as indicated at 39 in minutes, and the projected end of the screw 37 may be similarly marked in degrees and fractions up to 2°. A tension spring 41 connects the levers 28 and 33 to hold the stop 36 in engagement with the end of the screw 37.

To use the device the bars 10 and 11 may be placed on it with the openings 16 therein fitting over the pins 23 and 27 and with the wing nut 14 loosened. To set the bar to a desired angle the lever 33 may be moved to a position corresponding to the nearest 10° position smaller than the desired angle, and may be locked in place by the pin 35. Thereafter the levers 26 and 28 may be adjusted to the nearest 2° smaller than the desired angle and may be locked in position by the pin 32. For the final adjustment the knob 38 may be turned to swing both levers 26 and 28 through small angles within the 2° interval. At this time the bars 10 and 11 are set to the desired angular position and may be locked by tightening the wing nut 14. Thereafter the bars may be removed and used in layout work, machine work, or in any other desired manner, the edges of the bars being accurately positioned at the desired angle. With a construction as shown and described, it is possible to obtain accuracy within less than a minute without requiring extremely high precision. The settings of the levers 33 and of lever 26 relative to lever 28 can be accomplished very quickly and accurately to within 2° of the desired angle.

The sines of angles less than 2° have a straight-line relationship to the angles themselves within very close limits, so that the adjustment obtained by the micrometer screw 37 is extremely accurate within a 2° adjustment. Therefore, although this adjustment actually reads the sine of the angle it also corresponds to the actual angle itself to about the fifth decimal point. Thus the device is extremely accurate within the limits of its manufacturing tolerances, and at the same time does not require the extremely high precision and delicacy normally required for high precision instruments. It can therefore be manufactured at relatively low cost and can be used easily and effectively except where extreme accuracy is required.

While one embodiment of the invention has been shown and described in detail, it will be understood that this is illustrative only and is not to be taken as a definition of the scope of the invention, reference being had for this purpose to the appended claims.

What is claimed is:

1. A protractor comprising a frame, three levers pivoted on the frame on a common axis, means for connecting one of the levers to the frame in any one of a plurality of positions corresponding to predetermined angular intervals, the second and third of the levers being formed with series of openings therethrough to register in pairs in different angular positions of the levers corresponding to smaller angular intervals, and a rotatable micrometer type screw connecting said one of the levers to the second lever to provide a fine angular adjustment therebetween.

2. A protractor comprising a frame, guide means on the frame defining a base line, a plurality of levers pivoted on the frame on a common axis lying on the base line, guide means on one of the levers defining a line intersecting the axis, means to connect a second of the levers to the frame at any one of a plurality of positions corresponding to predetermined angular intervals, means to connect said one of the levers to a third of the levers in any one of a plurality of relative angular positions corresponding to smaller angular intervals, and adjustable means connecting the second and third levers.

3. A protractor comprising a frame, guide means on the frame defining a base line, a lever pivoted on the frame on an axis lying on the base line, guide means on the lever defining a line intersecting the axis, a pair of pivotally interconnected bars formed to engage the guide means with their pivotal axis aligned with the first named axis, means to hold the bars in adjusted angular position, and means to adjust the lever about its pivotal axis on the frame to a desired angular position.

4. A protractor comprising a frame, guide means on the frame defining a base line, a lever pivoted on the frame on an axis lying on the base line, guide means on the lever defining a line intersecting the axis, a pair of pivotally interconnected bars formed to engage the guide means with their pivotal axis aligned with the first named axis, means to hold the bars in adjusted angular position, a second lever pivoted on the frame on the first named axis, means to connect the second lever to the frame in any one of a plurality of positions corresponding to predetermined angular intervals, and adjustable means connecting the levers to adjust the angle therebetween.

5. A protractor comprising a frame, guide means on the frame defining a base line, a lever pivoted on the frame on an axis lying on the base line, guide means on the lever defining a line intersecting the axis, a pair of pivotally interconnected bars formed to engage the guide means with their pivotal axis aligned with the first named axis, means to hold the bars in adjusted angular position, a second lever pivoted on the frame on the first named axis, means to connect the second lever to the frame in any one of a plurality of positions corresponding to predetermined angular intervals, a third lever pivoted on the frame on the first named axis, means to connect the first and third levers in any one of a plurality of relative positions corresponding to smaller predetermined angular intervals, and adjustable means connecting the second and third levers to adjust the angle therebetween.

6. The construction of claim 5 in which the adjustable means comprises a micrometer type screw.

GEORGE B. MARSDEN.

REFERENCES CITED

The following references are of record in the file of this patent:

UNITED STATES PATENTS

| Number | Name | Date |
| --- | --- | --- |
| 346,519 | Tybjerg | Aug. 3, 1886 |
| 1,387,297 | Neumaier | Aug. 9, 1921 |
| 2,136,958 | Tyson | Nov. 15, 1938 |